United States Patent [19]

Logioco

[11] 4,243,834
[45] Jan. 6, 1981

[54] CABLE CLOSURE REHABILITATION APPARATUS

[75] Inventor: John W. Logioco, Middletown, N.J.

[73] Assignee: Bell Telephone Laboratories, Incorporated, Murray Hill, N.J.

[21] Appl. No.: 2,989

[22] Filed: Jan. 12, 1979

[51] Int. Cl.³ .............................................. H02G 9/02
[52] U.S. Cl. ....................................... 174/38; 174/51; 174/60
[58] Field of Search ...................... 174/37, 38, 51, 60; 361/426, 427, 428, 429

[56] References Cited

U.S. PATENT DOCUMENTS

| Re. 27,746 | 8/1973 | Hamilton | 174/38 |
|---|---|---|---|
| Re. 27,898 | 1/1974 | Baumgartner | 174/38 |
| 2,648,721 | 8/1953 | Wayman | 174/82 |
| 3,864,510 | 2/1975 | Ramsey, Jr. et al. | 174/38 |
| 3,991,264 | 11/1976 | Connell | 174/38 |

FOREIGN PATENT DOCUMENTS

| 1144806 | 3/1963 | Fed. Rep. of Germany | 174/60 |
|---|---|---|---|
| 2725461 | 10/1978 | Fed. Rep. of Germany | 174/37 |

Primary Examiner—Laramie E. Askin
Attorney, Agent, or Firm—John W. Fisher

[57] ABSTRACT

Apparatus is disclosed for converting a ready access cable closure (10) to a limited access configuration. The conversion apparatus includes a hoodlike member (20) for enclosing a first preselected number of cable conductors (17) such that access to these conductors by unauthorized craftspersons is inhibited while permitting access to a second preselected number of cable conductors (40). Also included with the conversion apparatus are means (50, 51, 52, 53) for effecting a flexible ground bond connection between the cable ground sheaths and the pedestal cable closure.

10 Claims, 9 Drawing Figures

FIG. 8
FIG. 9
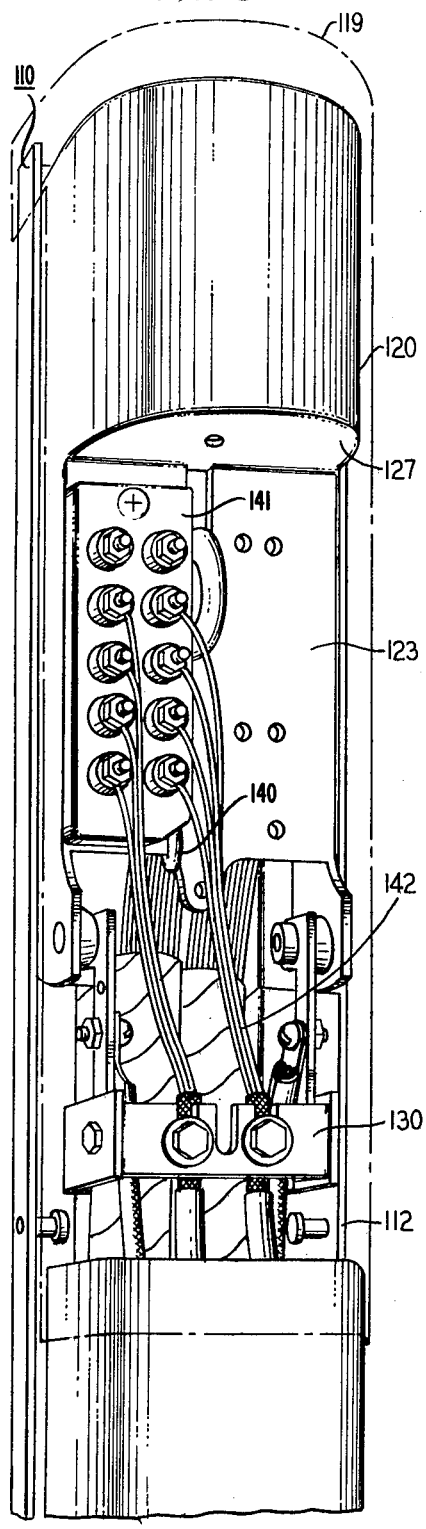
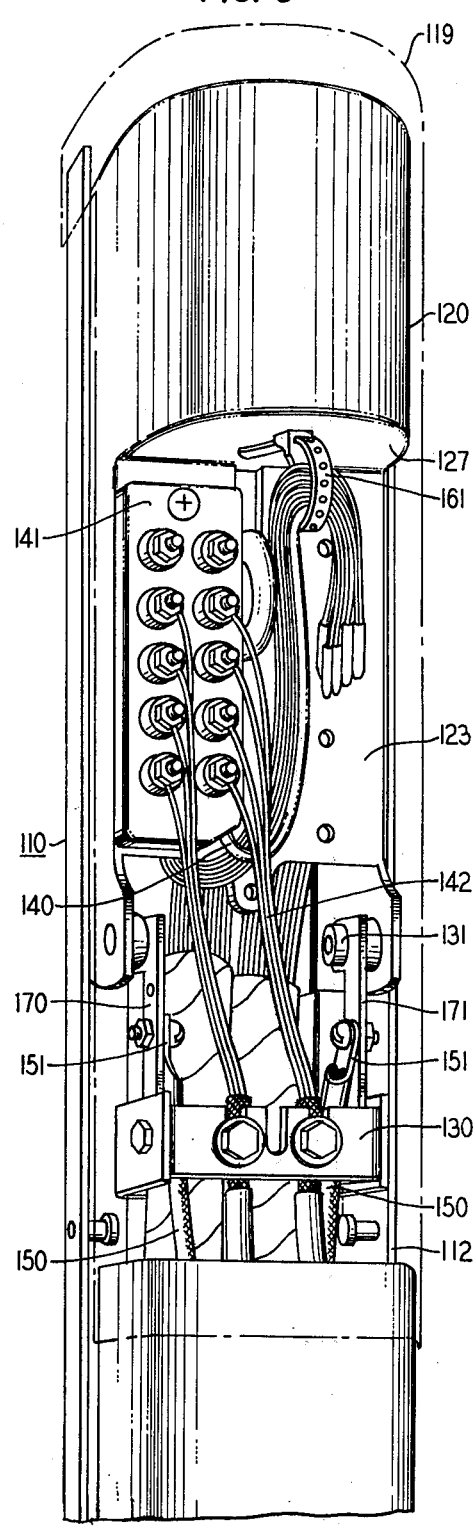

CABLE CLOSURE REHABILITATION APPARATUS

BACKGROUND OF THE INVENTION

1. Technical Field of the Invention

This invention relates to telephone cable closures and, in particular, to apparatus for converting a ready access cable closure to a limited access configuration.

2. Description of the Prior Art

The vast majority of cable closures currently in use in the telecommunications industry are of a ready access type. Because of this ready access feature the cross connection wiring in these closures, while initially fairly neat and orderly, very quickly becomes a virtual rat's nest. In this condition additional entries into the closure quite frequently disrupt various cross connections and individual conductors are subject to damage by a craftsperson.

One example of this type of telephone cable closure is disclosed in C. C. Connell, U.S. Pat. No. 3,991,264 issued Nov. 9, 1976. Connell discloses a terminal box for use with telephone cable systems which includes a housing formed of geometrically identical channels interfitted by tongue and groove edge portions. Vertical brackets within the housing are movable along U-shaped horizontal supports to permit an increase in spacing between terminal blocks when making electrical connections. Individual conductor pairs in the cables terminated in the Connell closure are accessible to a craftsperson.

Another example of this type of terminal enclosure is disclosed in D. L. P. Hamilton, U.S. Pat. No. Re. 27,746 issued Aug. 28, 1973. Hamilton discloses a terminal chamber used for buried cable installations which is compartmented by plate-like supporting and partition members. The partition members carry spliced conductors. An unassigned conductor loop is secured to and overlies its front face. Another loop of unassigned conductors lies behind the partition member. Similar to Connell, the Hamilton closure does not preclude access to the unassigned conductors. Moreover, in Hamilton the cable ground sheaths are rigidly fastened to the closure.

An even further illustration of closures of the type under discussion is contained in R. G. Baumgartner, U.S. Pat. No. Re. 27,898 issued Jan. 22, 1974. Baumgartner relates to a pedestal-type telephone cable closure which comprises a base and an upper housing of like cross section. The base is mounted on a channel driven into the ground. Cables are led in through the base portion and supported on a bonding clamp that also contacts the metallic shield of the cable. A center partition in the upper housing physically segregates the pairs to which service wire splices are to be made. Similar to the other references, the Baumgartner closure does not restrict access to certain ones of the conductor pairs. Furthermore, as noted previously, the cables are supported by a rigid ground bonding arrangement.

SUMMARY OF THE INVENTION

The foregoing problems are greatly alleviated in accordance with my invention. One illustrative embodiment of my invention comprises apparatus for converting a ready access pedestal cable closure, that includes a base member and a cover, to a limited access configuration. The apparatus includes means affixable to the base member and under the cover for enclosing a first preselected number of cable conductors while permitting access to a second preselected number of cable conductors such that access by unauthorized craftspersons is inhibited to the first preselected number of cable conductors.

In addition to restricting access to particular conductors in a cable loop, a further advantage of my apparatus is that it includes components for providing a flexible ground bond connection between the cable ground sheaths. This flexible ground bond arrangement is effected with one or more short ground straps which are connected to the main cable sheaths with bond clamps.

BRIEF DESCRIPTION OF THE DRAWINGS

The aforementioned advantages of my invention as well as other advantages will be better understood upon a consideration of the following detailed description and the appended claims taken in conjunction with the attached drawings of an illustrative embodiment in which:

FIG. 8 is similar to FIG. 4 except the shape of the conversion apparatus has been adapted to fit pedestal closures having the generally irregular cross-sectional configuration; and FIG. 9 is similar to FIG. 8 except a limited number of conductors are made available for ready access use in a preferred count configuration.

DETAILED DESCRIPTION

Figure 1:
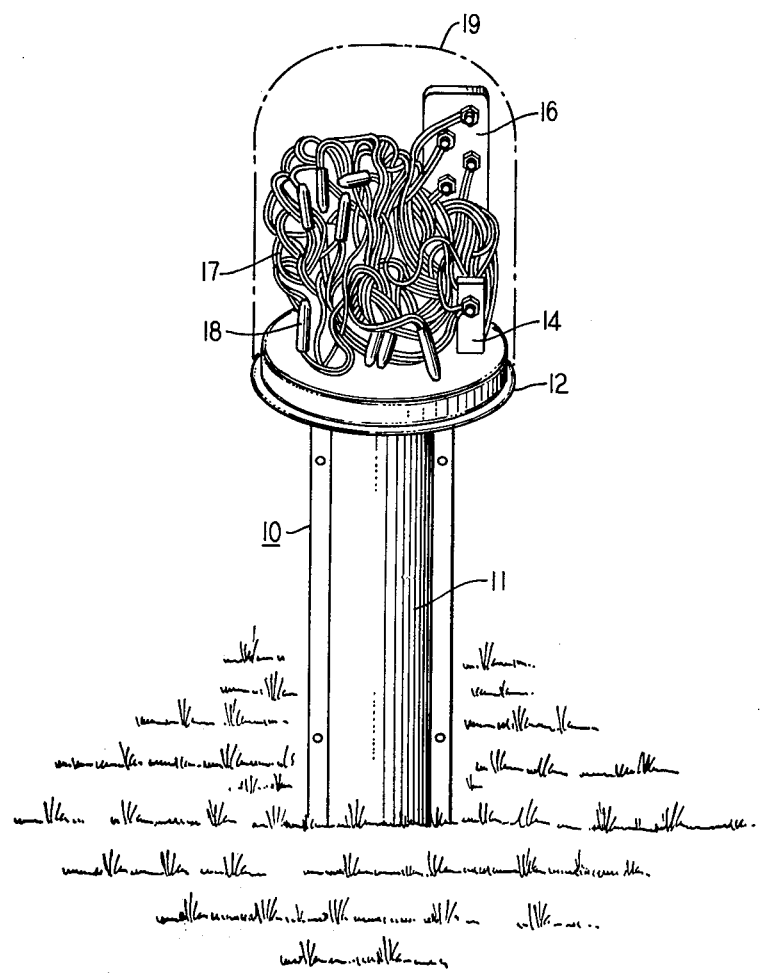
FIG. 1 is a prior art pedestal closure of the ready access type with its cover removed illustrating the virtual rat's nest of cable conductors.

Shown in FIG. 1 is a prior art ready access pedestal cable closure 10. Closure 10 includes support member 11 which has affixed thereto base number 12. On the top surface of base member 12 there is affixed ground bracket 14 and terminal strip 16. Conductors 17 are brought up through support member 11 to base member 12. Entry through the cable sheath to cable conductors 17 to effect connection to subscriber lines is gained at this point. Connection of the subscriber lines to conductors 17 is accomplished on terminal strip 16. Due to numerous cross connection changes, a substantial number of conductors 17 must be interconnected to one another by splice connectors 18. The entire base assembly along with conductors 17 is enclosed by cover 19 shown in phantom in FIG. 1.

It is no doubt safe to assume that conductors 17, when initially placed in closure 10, have some semblance of order. However, with repeated entries into closure 10 by a craftsperson to effect changes in the cross connection wiring, conductors 17 very quickly take on a jumbled configuration. With each subsequent entry into closure 10, the jumbled mass of conductors 17 is more susceptible to disruption and damage by the craftsperson.

Figure 2:
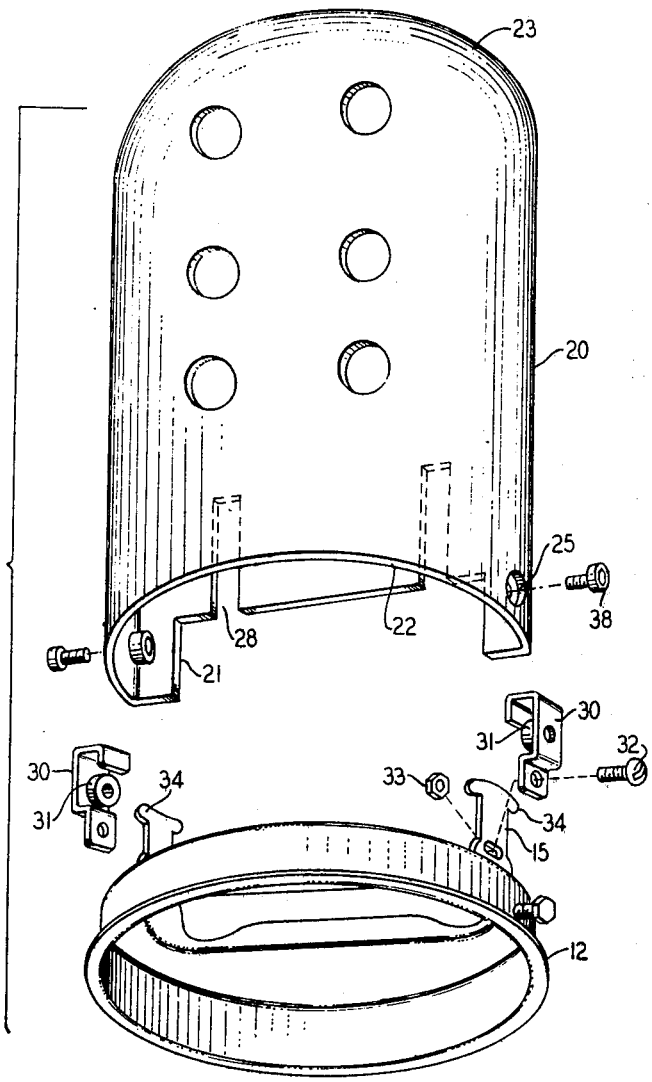
FIG. 2 is an exploded perspective view of one embodiment of the conversion apparatus.

To greatly alleviate this potential hazard to conductors 17, the conversion apparatus illustrated in FIG. 2 is employed. This conversion apparatus includes a hoodlike member 20 which is affixable to a base member 12 beneath cover 19. Hoodlike member 20 encloses a first group of cable conductors 17 to inhibit access thereto by unauthorized craftspersons while permitting access to a second group of these conductors.

Hoodlike member 20 is comprised of planar sidewall 21 and curved sidewall 22. Vertical edges of curved sidewall 22 are integrally joined to vertical edges of planar sidewall 21. A truncated semispherical cap 23 completes the structure. Edges of cap 23 are integrally joined with top edges of planar sidewall 21 and curved sidewall 22.

Near the point of juncture of the vertical edges of planar sidewall 21 with the vertical edges of curved sidewall 22, but lying wholly within curved sidewall 22, are a pair of spaced apart oppositely directed recesses 25. The purpose for recesses 25 will become apparent subsequently.

Hoodlike member 20 is affixable to base member 12 by the use of hooklike-shaped mounting bracket 30. Fastened to a central region of mounting bracket 30 is a threaded member 31. This assembly is affixed to base member 12 by screw 32 and nut 33 which secure mounting bracket 30 to a mounting tab 15 integral with base member 12. Mounting tab 15 includes a pair of oppositely directed ears 34 which interact with one end of mounting bracket 30 to facilitate the alignment of mounting bracket 30 with mounting tab 15.

Figure 3:
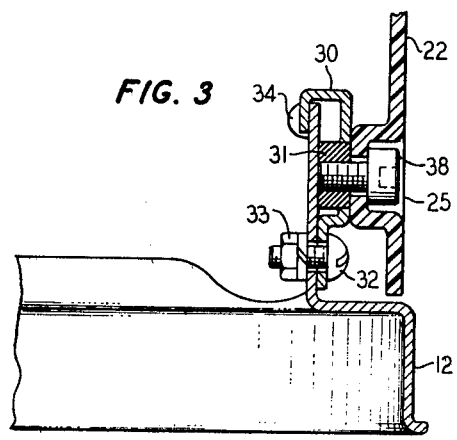
FIG. 3 illustrates the mounting arrangement of the conversion apparatus of FIG. 2 to prevent access by unauthorized craftspersons.

The method for fastening hoodlike member 20 to base member 12 is shown in FIG. 3. Recesses 25 in curved sidewall 22 of hoodlike member 20 are positioned juxtaposed mounting brackets 30 such that mounting bolts 38 are engageable with threaded members 31. Mounting bolts 38 are extendable through and secludable in recesses 25. The heads of mounting bolts 38 are designed such that a special tool (not shown) is required to tighten bolts 38 in place. This special tool is not made available to craftspersons which enter closures 10 only to make wiring changes. Consequently, once a preselected number of conductors 17 are housed within the interior chamber of hoodlike member 20, access by unauthorized craftspersons is inhibited.

Figure 4:
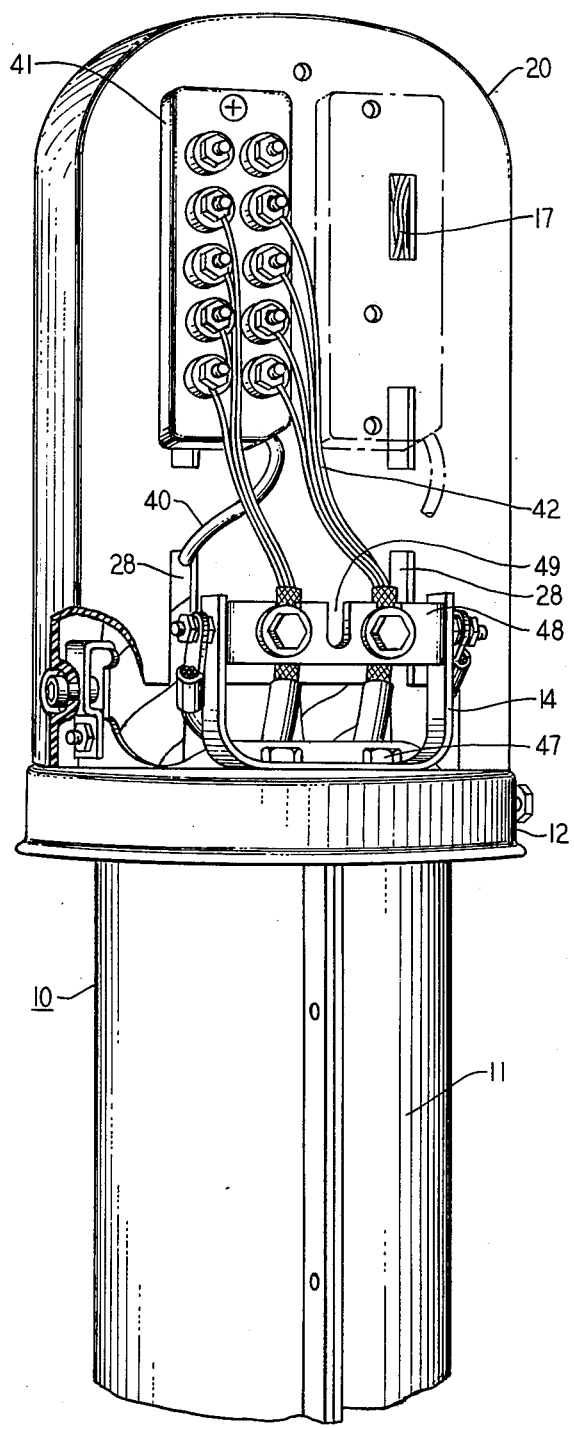
FIG. 4 is the same pedestal closure of FIG. 1 after modification in accordance with the subject invention to a limited access fixed count configuration.

A pedestal closure 10, after modification in accordance with the subject invention to a limited access fixed count configuration, is shown in FIG. 4. All of first conductors 17 are enclosed within hoodlike member 20 except that access to a small number of first conductors 17 is achieved with stub cable 40. Stub cable 40 contains second conductors (not shown) which are electrically coupled to terminals on the back of terminal block 41. Termination of subscriber lines 42 on the front of terminal block 41 completes the connection between conductors 17 and the subscriber. To facilitate the routing of stub cable 40 from terminal block 41 to conductors 17, hoodlike member 20 is provided with a pair of routing slots 28. Slots 28 are provided in a bottom edge of planar sidewall 21.

Bracket 14 is used to provide support for subscriber lines 42. Bracket 14 is secured to base member 12 by a pair of bolts 47. Affixed to brakcet 14 is a generally U-shaped bar 48. Bar 48 has one or more U-shaped notches 49 therein to facilitate engagement with subscriber lines 42.

Figure 5:
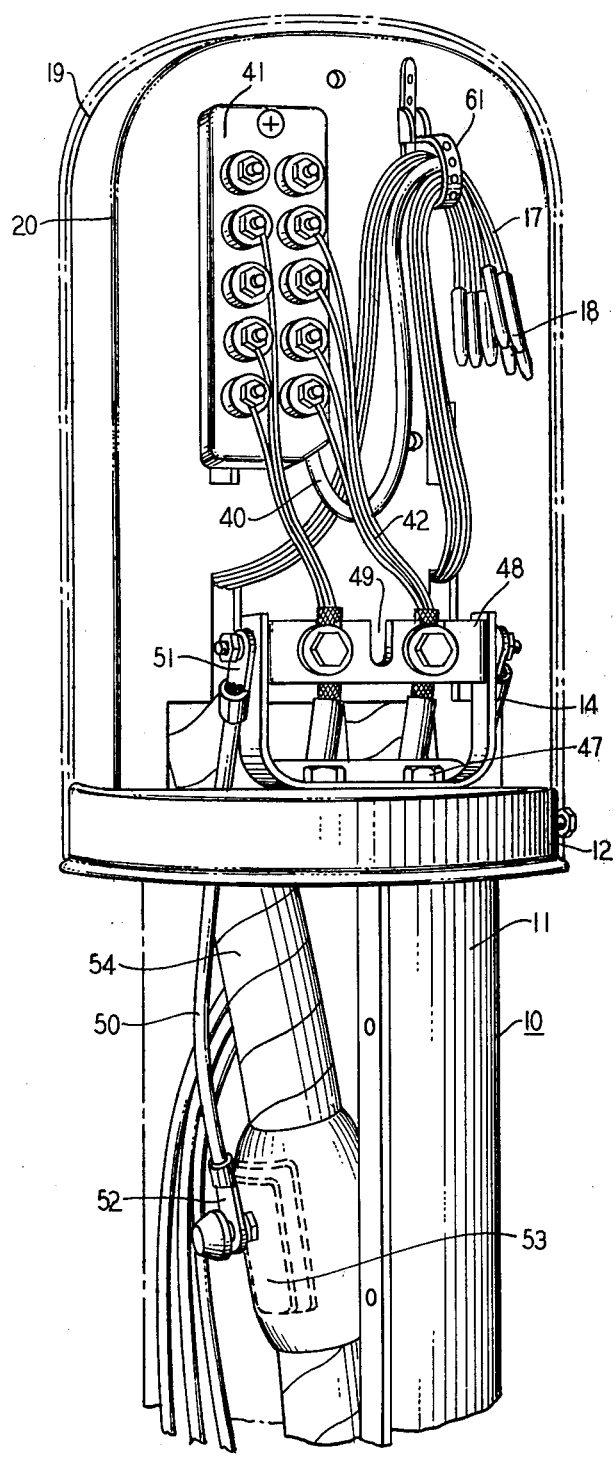
FIG. 5 is similar to FIG. 4 except a limited number of conductors are made available for ready access use in a preferred count configuration.

As shown more clearly in FIG. 5, a flexible ground arrangement utilizes at least one ground strap 50 having terminal lug 51 at one end and terminal lug 52 at an opposite end. Terminal lug 51 is affixable to mounting bracket 14 whereas terminal lug 52 is affixable to ground bond clamp 53. Clamp 53 in turn is affixed to the ground sheath surrounding main cable 54. By utilizing this arrangement ground bonding is made more flexible to deal with ever changing environmental conditions. It should be noted that a similar ground bond arrangement would be used on the other portion of main cable 54, but this connection is only partially visible in FIG. 5.

The modified closure shown in FIG. 5 also illustrates an alternate arrangement of conductors 17 such that a small portion of the conductors 17 is made available for ready access use in a preferred count configuration. This group of conductors 17 and stub cable 40 are held in place on hoodlike member 20 by an insulative flexible fastener 61.

Figure 6:
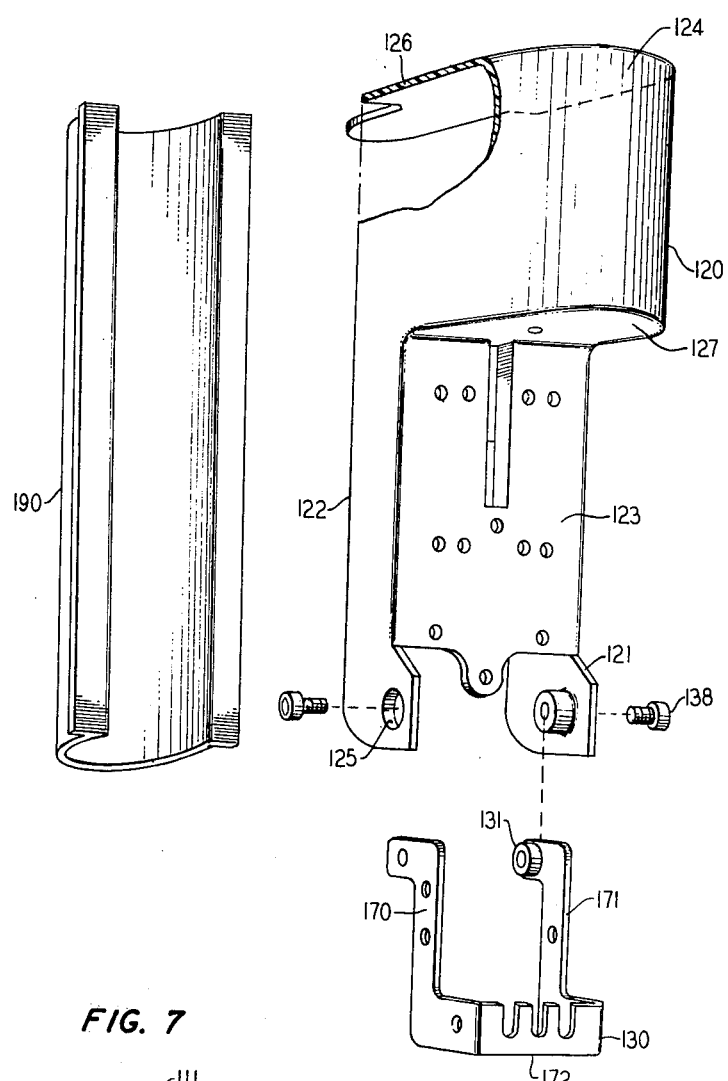
FIG. 6 is an exploded perspective view of an alternate embodiment of the conversion apparatus.
Figure 7:
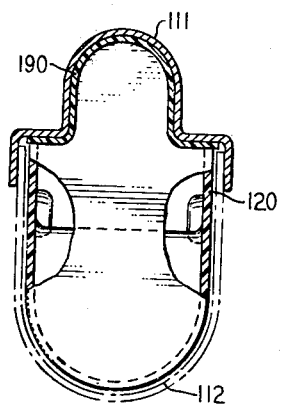
FIG. 7 is a cross-sectional view of the closure conversion apparatus of FIG. 6 when installed in a pedestal closure having a generally irregular cross-sectional configuration.

An alternate embodiment of the conversion apparatus for use with irregularly shaped pedestal cable closures 110, as shown in cross section in FIG. 7, is illustrated in FIG. 6. This alternate embodiment is mounted on closure 110 beneath cover 119 shown in phantom in FIGS. 8 and 9. In this embodiment hoodlike member 120 is comprised of first and second planar sidewalls 121 and 122 which lie in first and second spaced apart parallel planes. A third planar sidewalls 123 has edges which perpendicularly interest and integrally join with edges of sidewalls 121 and 122. Planar sidewall 123 is perpendicular to the first and second parallel planes containing planar sidewalls 121 and 122. Positioned just above sidewall 123 is curved sidewall 124. Curved sidewall 124 has edge portions which are integrally joined to edge portions of planar sidewalls 121 and 122. Atop curved sidewall 124 and integrally joined thereto is wall 126. Wall 127, edges of which are integrally joined to edges of planar sidewalls 121, 122 and 123 are curved sidewall 124, completes the structure of hoodlike member 120.

It should be noted that hoodlike member 120 performs the same function as hoodlike member 20 described previously, that being to enclose a group of cable conductors 17 to inhibit access thereto by unauthorized craftspersons while permitting access to a preselected number of conductors.

Near bottom edges of planar sidewalls 121 and 122 at a point removed from curved sidewall 124 near the point of juncture of vertical edges of planar sidewalls 121 and 122 with planar sidewall 123 are recesses 125. Recesses 125 serve the same purpose as recesses 25 in hoodlike member 20, that is, to facilitate mounting of hoodlike member 120 such that access by unauthorized craftspersons is inhibited.

To effect the mounting of hoodlike member 120 to base member 112, shown most clearly in FIGS. 8 and 9, mounting bracket 130 is employed. Mounting bracket 130 is comprised of a pair of generally Z-shaped members 170 and 171 coupled together by cross member 172. Affixed to upper arms of each of members 170 and 171 is a threaded member 131. When mounting hoodlike member 120, mounting bolt 138 is inserted into recesses 125 and brought into engagement with threaded member 131. Once in place mounting bolts 138 are secluded within recesses 125.

Also included with the alternate embodiment of the conversion apparatus is an insulative shield 190. Insulative shield 190 is placed adjacent to the inside rear wall of support member 111 as shown in FIG. 7. Consequently, upon completion of the conversion process, closure 110 has an insulative enclosure surrounding cable conductors 17 to which access is to be inhibited.

Similar to the arrangement of closure 10, shown in FIG. 4, the modified closure 110 in FIG. 8 is provided with a terminal block 141 having a stub cable 140 affixed thereto. Stub cable 140 contains second conductors (not shown) which are electrically coupled to terminals on the back of terminal block 141. Stub cable 140 is routed from the inside of hoodlike member 120 to terminal block 141 through an opening at the bottom of third planar sidewall 123. Connection between the preselected group of conductors 17 and subscriber lines 142 is effected through terminal block 141.

In those cases where a small portion of ready access conductors are to be retained within closure 110, as shown in FIG. 9, they are brought out of hoodlike member 120 and fastened thereto on wall 127 by an insulative flexible fastener 161. It should be noted also that the modified closure 110 is provided with a flexible ground bond arrangement similar to that described above with respect to FIG. 5. However, in this instance terminal lug 151 on the end of ground strap 150 is coupled to a central portion of Z-shaped members 170 and 171.

In all cases it is to be understood that the above-identified embodiments are illustrative of but a small number of many possible specific embodiments which can represent applications of the principles of the invention. Thus, numerous and various other embodiments can be devised readily in accordance with these principles by those skilled in the art without departing from the spirit and scope of the invention.

I claim:

1. In combination:
  a pedestal cable closure including
    a base member;
    first and second preselected numbers of cable conductors supported on said base member;
    a cover, affixable to said base member, for enclosing said cable conductors; and
  means for converting said pedestal cable closure from a ready access configuration to a limited access configuration, said converting means including
    a hoodlike member having
      a planar sidewall;
      a curved sidewall, vertical edges of which are integrally joined to vertical edges of said planar sidewall;
      a truncated semispherical cap, edges of which are integrally joined with top edges of said planar sidewall and said curved sidewall; and
      a pair of spaced-apart oppositely directed recesses in said curved sidewall, said recesses positioned near the points of juncture of said vertical edges of said curved sidewall with said vertical edges of said planar sidewall; and
    means, juxtaposed said recesses, for securing said hoodlike member to said base member under said cover such that access to said first preselected number of cable conductors by an unauthorized craftsperson is inhibited, said securing means comprising
      a hooklike-shaped mounting bracket having one end thereof adapted for affixation to said base member, said bracket having affixed thereto in a central region a threaded member; and
      threaded means, extendable through and secludable in said oppositely directed recesses, for engaging said mounting bracket threaded member such that said hooklike member is securable to said base member.

2. The combination in accordance with claim 1 further including:
  a terminal block affixed to said planar sidewall; and
  means for coupling said second preselected number of cable conductors to said terminal block.

3. The combination in accordance with claim 1 further including:
  means, provided in a bottom edge of said planar sidewall, for routing said second preselected number of cable conductors out of said hoodlike member.

4. In combination:
  a pedestal cable closure including
    a base member;
    first and second preselected numbers of cable conductors supported on said base member;
    a cover, affixable to said base member, for enclosing said cable conductors; and
  a hoodlike member, affixable to said base member under said cover, for enclosing said first preselected number of cable conductors while permitting access to said second preselected number of cable conductors such that access by unauthorized craftspersons is inhibited to said first preselected number of cable conductors, said hoodlike member having
    first and second planar sidewalls lying in first and second spaced apart parallel planes;
    a third planar sidewall edges of which perpendicularly intersect and integrally join with edges of said first and second planar sidewalls;
    a curved sidewall spaced above said third planar sidewall, edge portions of which are integrally joined to said first and second planar sidewalls; and
    fourth and fifth spaced apart planar walls edges of which are integrally joined to edge portions of said curved sidewall and said first and second planar sidewalls, edge portions of said fourth planar wall also integrally joined with an edge portion of said third planar sidewall.

5. The combination in accordance with claim 4 wherein said hoodlike member further includes:
  a pair of spaced apart oppositely directed recesses positioned in said first and second planar sidewalls at points removed from said curved sidewall near the points of juncture of vertical edges of said first and second planar sidewalls with said third planar sidewall; and
  means, juxtaposed said recesses, for securing said hoodlike member to said base member such that access by an unauthorized craftsperson is inhibited.

6. The combination in accordance with claim 5 wherein said securing means includes:
  first and second generally Z-shaped members integrally coupled to one another by a cross member, upper arms of said Z-shaped members each having affixed thereto a threaded member; and threaded means, extendable through and secludable in said oppositely directed recesses, for engaging said threaded member such that said hoodlike member is securable to said base member.

7. The combination in accordance with claim 6 further including:
   a terminal block affixed to said third planar sidewall; and
   means for coupling said second preselected number of cable conductors to said terminal block.

8. The combination in accordance with claim 6 further including:
   at least one ground strap having terminal lugs at each end;
   means, affixable to a central portion of said Z-shaped member, for engaging one terminal lug of said ground strap, and
   means, affixable to a cable ground sheath, for engaging the other terminal lug of said ground strap.

9. Apparatus for converting a pedestal cable closure from a ready access configuration to a limited access configuration, said apparatus having component parts capable of being assembled in the field to a base of said pedestal cable closure, said apparatus comprising the combination of:
   a hoodlike member having a planar sidewall; a curved sidewall, vertical edges of which are integrally joined to vertical edges of said planar sidewall; a truncated semispherical cap, edges of which are integrally joined with top edges of said planar sidewall and said curved sidewall; and a pair of spaced apart oppositely directed recesses in said curved sidewall, said recesses positioned near the points of juncture of said vertical edges of said curved sidewall with said vertical edges of said planar sidewall;
   a hooklike-shaped mounting bracket having one end thereof adapted for affixation to said pedestal cable closure base, said bracket having affixed thereto in a central region a threaded member; and
   threaded means, extendable through and secludable in said oppositely directed recesses, for engaging said mounting bracket threaded member such that said hoodlike member is securable to said pedestal cable closure base.

10. Apparatus for converting a pedestal cable closure from a ready access configuration to a limited access configuration, said apparatus having component parts capable of being assembled in the field to a base of said pedestal cable closure, said apparatus comprising the combination of:
    a hoodlike member having first and second planar sidewalls lying in first and second spaced apart parallel planes; a third planar sidewall edges of which perpendicularly intersect and integrally join with edges of said first and second planar sidewalls; a curved sidewall spaced above said third planar sidewall, edge portions of which are integrally joined to said first and second planar sidewalls; fourth and fifth spaced apart planar walls edges of which are integrally joined to edge portions of said curved sidewall and said first and second planar sidewalls, edge portions of said fourth planar wall also integrally joined with an edge portion of said third planar sidewall; and a pair of spaced apart oppositely directed recesses positioned in said first and second planar sidewalls at points removed from said curved sidewall near the points of juncture of vertical edges of said first and second planar sidewalls with said third planar sidewall;
    first and second generally Z-shaped members integrally coupled to one another by a cross member, upper arms of said Z-shaped members each having affixed thereto a threaded member; and
    threaded means, extendable through and secludable in said oppositely directed recesses, for engaging said threaded member such that said hoodlike member is securable to said pedestal cable closure base by said first and second generally Z-shaped members.

* * * * *